March 25, 1952     B. BROWNSTEIN     2,590,503
HYDRAULIC PRESSURE CONTROL APPARATUS
Filed March 25, 1946     3 Sheets-Sheet 1
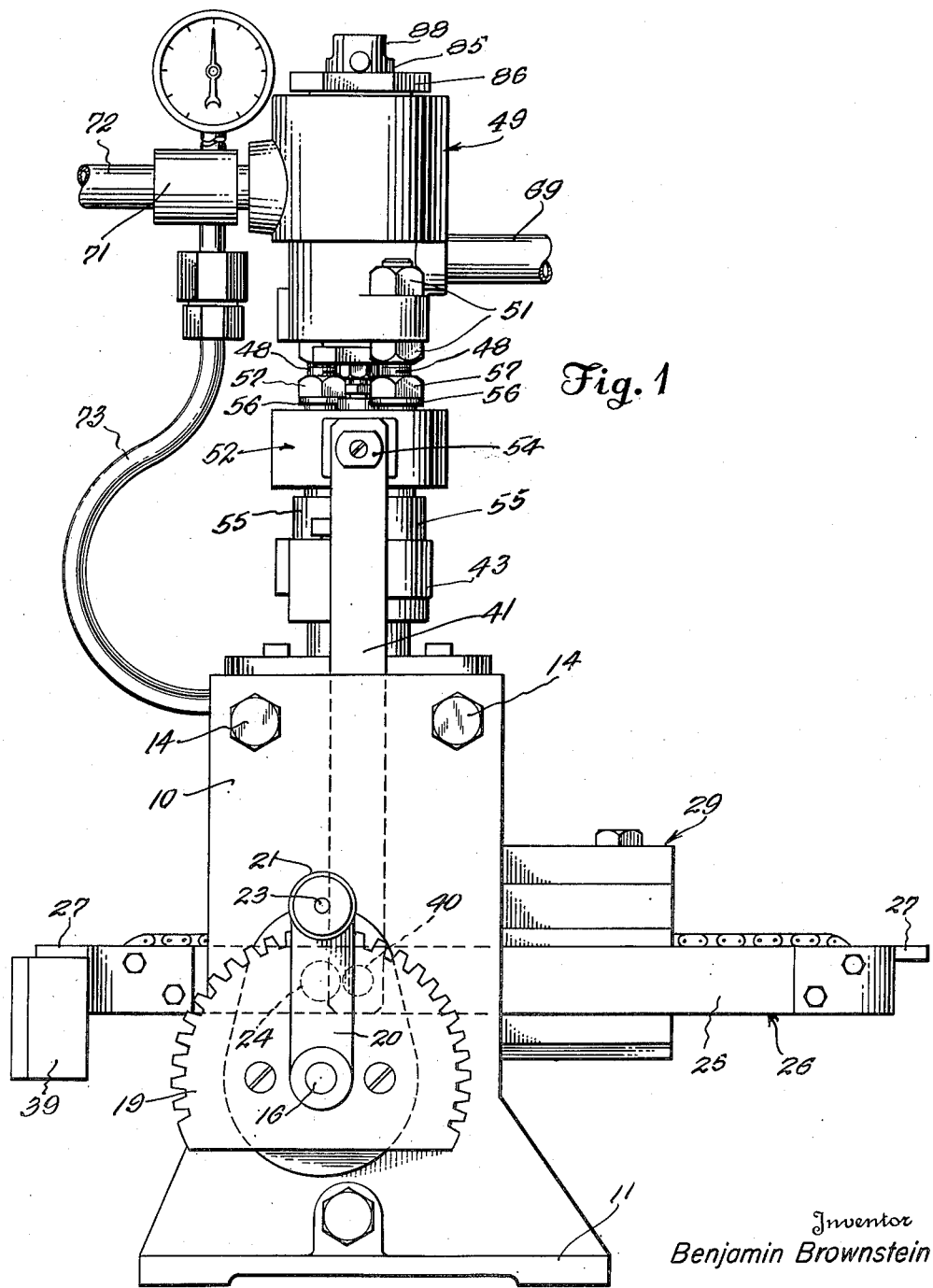
Inventor
Benjamin Brownstein
By Wilfred E. Lawson
Attorney March 25, 1952  B. BROWNSTEIN  2,590,503
HYDRAULIC PRESSURE CONTROL APPARATUS
Filed March 25, 1946  3 Sheets-Sheet 2
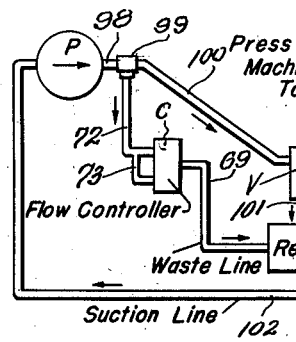
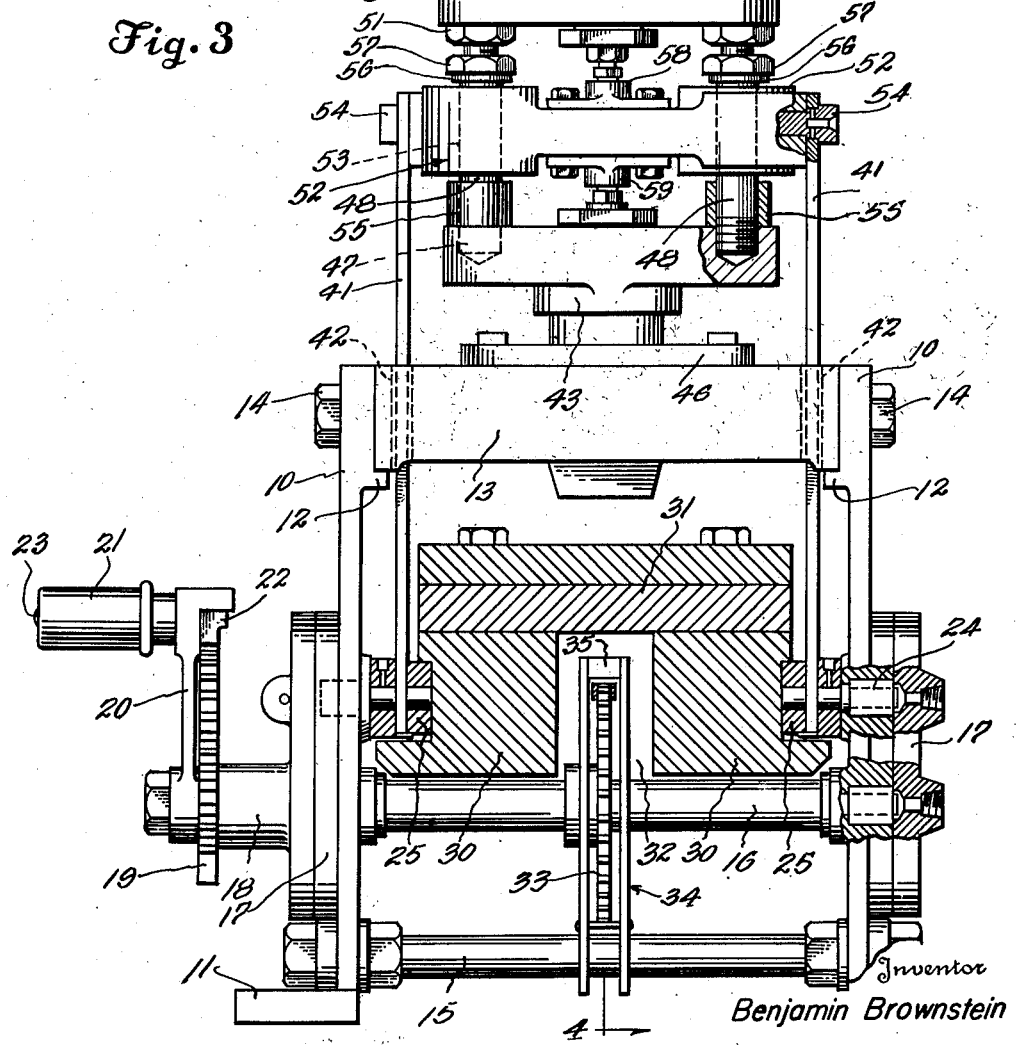
Inventor
Benjamin Brownstein
By Wilfred E. Lawson
Attorney March 25, 1952 B. BROWNSTEIN 2,590,503
HYDRAULIC PRESSURE CONTROL APPARATUS
Filed March 25, 1946 3 Sheets-Sheet 3
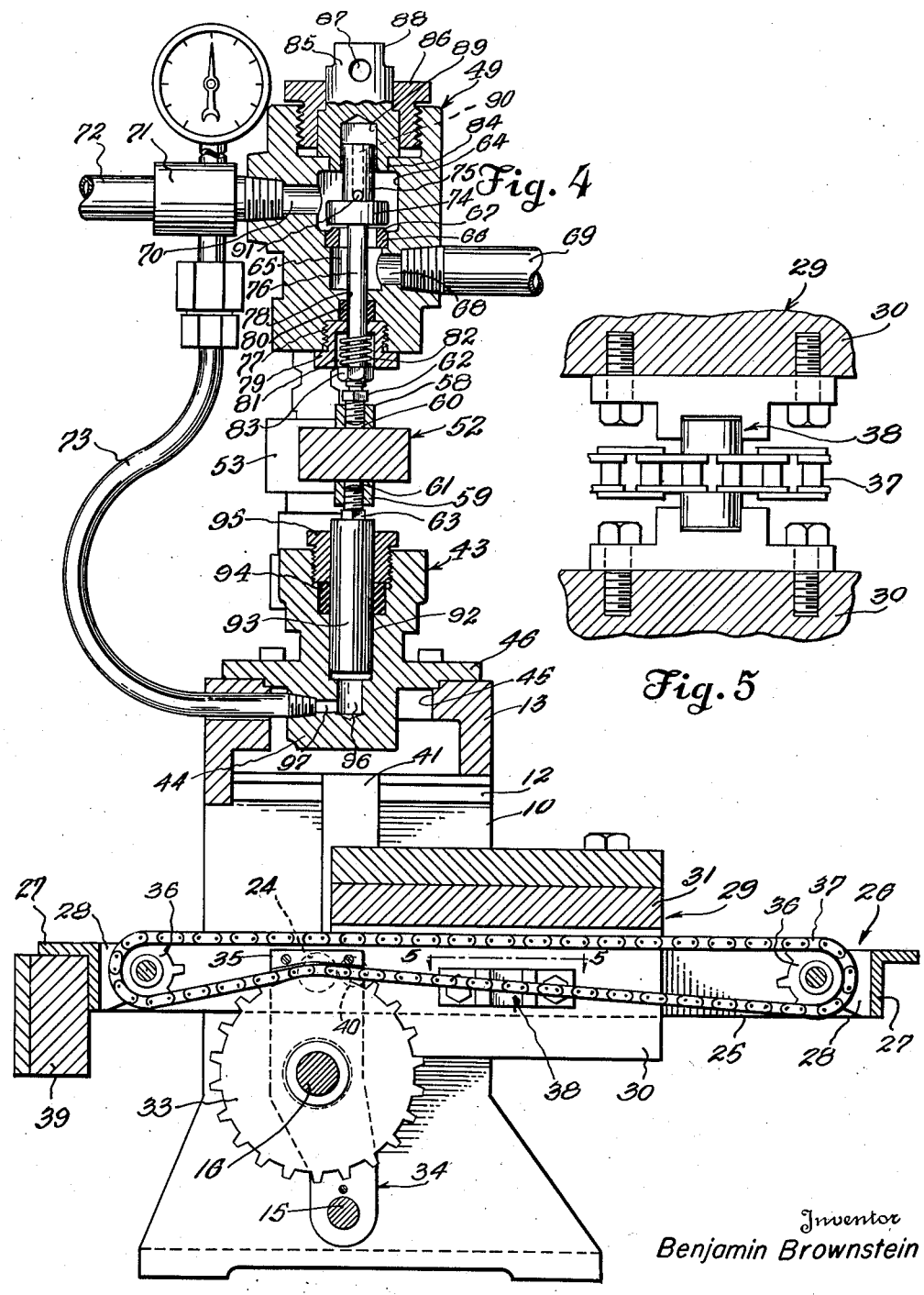
Inventor
Benjamin Brownstein
By Wilfred E. Lawson
Attorney Patented Mar. 25, 1952

2,590,503

UNITED STATES PATENT OFFICE 2,590,503

HYDRAULIC PRESSURE CONTROL APPARATUS

Benjamin Brownstein, Ellwood City, Pa.

Application March 25, 1946, Serial No. 656,882

6 Claims. (Cl. 137—153)

1

This invention relates generally to hydraulic pressure producing and pressure and flow control apparatus designed for use in connection with machines operated by hydraulic pressure such as presses, testers, machine tools and the like, and the invention pertains particularly to means for automatically producing pressure and controlling the pressure and flow of the liquid as applied to such machines through the automatic control of the pressure and flow of the liquid discharged by the pump into the feed line that feeds the machines.

The present invention is based upon and constitutes an improvement over the hydraulic pressure and flow controller disclosed in my prior Patent No. 2,172,901, granted September 12, 1939.

A principal object of the present invention is to provide an improved design of a pressure producing and pressure and flow control valve of the apparatus whereby the desired fluid pressure is produced and maintained through the application of the liquid pressure to the control valve acting in opposition to the liquid pressure produced by a ram in a pressure cylinder, which tends to unseat the valve, such action setting up a pressure and flow control which permits excess liquid to be squeezed under pressure past the valve to a fluid return or waste line.

Another object of the invention is to provide an improved flow control means in an apparatus of the character disclosed in my prior patent above identified, wherein the control valve is so designed that sudden surges in the fluid pressure while the same is building up or after the desired pressure is reached, will not cause an unbalancing of the control valve and a sudden drop in the line pressure.

Still another object of the invention is to provide an improved hydraulic pressure and flow controlling apparatus, wherein improvements in the design of the control valve make possible the application of a novel principle of balanced pressures obtained entirely through the application of a squeezing action set up by the fluid on the control mechanism so that excess liquid in the feed line is permitted to escape under pressure from the control valve and the pressure in the feed line, for which the controller is set, is maintained continuously as long as a fluid pump works and without placing dependence upon control springs acting on the valve.

Other objects and advantages of the invention will become apparent as the description of the same proceeds and the invention will be best understood from a consideration of the following

2 ing detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Figure 1 is a view in side elevation of an apparatus constructed in accordance with the present invention.

Figure 2 is a view partly in front elevation and partly in vertical section, the sectioned portion comprising the balance weight structure.

Figure 3 is a schematic diagram showing the connection of the apparatus to a pump and to a machine being operated thereby.

Figure 4 is a vertical section taken substantially on the line 4—4 of Figure 2.

Figure 5 is a fragmentary section taken substantially on the line 5—5 of Figure 4.

The improvements of the present hydraulic pressure producer and pressure and flow controller over the structure shown in my Patent No. 2,172,901, of September 12, 1939, are directed primarily to the valve and pressure units and connecting tie rods. However, in order that a complete understanding of the operation of the controller may be had from the present specification without requiring that reference be had to my prior patent, the present application includes certain duplicate views from the prior patent with a general statement of construction and operation of the base structure, the weight and operating mechanism.

Referring now more particularly to the drawings, the numeral 10 designates the side walls or side plates of the machine supporting frame, each of which at its lower edge, is formed integral with an outwardly directed foot flange 11. Adjacent to their top edges, the side plates of the frame structure have the inwardly extending flanges 12 upon which is supported the bed block 13, which is secured to the side plates by cap screws 14 or in any other suitable manner.

Extending transversely of the lower part of the base, between the frame side plates 10, is a tie bar or rod 15 and in a plane above this side bar there is disposed a shaft 16, the ends of which are mounted in suitable bearing units, each of which is generally designated 17 and the construction of which is set forth in detail in my issued patent hereinbefore referred to.

The shaft 16 at one end extends through a fixed bearing sleeve 18 which is disposed upon the outer side of the adjacent frame plate 10 and this bearing sleeve supports a gear segment 19 for the purpose hereinafter stated.

Outwardly of the gear segment 19 the shaft 16 has secured thereto one end of a crank lever 20, upon the outer end of which is the crank handle 21. This handle 21 is of tubular form and has slidably mounted therein a pawl 22 which is adapted for engagement with the gear segment 19. The outer end of this pawl is exposed through the outer end of the handle 21 as indicated at 23, whereby means is provided for shifting the pawl to a position free of connection with the segment 19 thereby releasing the crank arm 20 so that turning motion may be imparted to the shaft 16 for shifting the hereinafter described control weight.

Mounted in suitable bearings in the frame side plates 10, directly above the shaft 16, are pivot or fulcrum pins 24 which extend inwardly with respect to the plates 10 and each of these pins passes through a side arm 25 of a weight frame which is generally designated 26 and which includes, in addition to the side arms or rails 25, the transverse front and rear rails 27 and bracket 28.

Disposed between and slidably supported upon the side rails 25 of the frame 26 is a weight unit which is generally designated 29 and which is here illustrated as comprising the two spaced side portions 30 and the top plate 31 although, as will be obvious, this weight structure may be made in a single piece if found feasible.

By the spacing of the two portions 30 of the weight there is provided at the longitudinal center of the frame, the clear space 32 and extending up into this space is a portion of a sprocket gear 33 which is carried upon the shaft 16. This sprocket gear 33 is disposed between the two sides of an open frame 34, the lower part of which frame is supported upon the tie rod 15 while the upper part carries a guard plate 35 which lies in relatively close proximity to the top edge of the sprocket gear and functions to maintain the hereinafter described sprocket chain with one side or one run thereof permanently in operative conection with the teeth of the gear 33.

At each end of the frame there is pivotally supported a small sprocket gear 36 and these gears are connected by the endless sprocket chain 37 which runs lengthwise of the center of the frame 26 and has the lower run extended over and in toothed connection with the control wheel 33, passing through the frame 34 and beneath the cross plate 35 thereof as illustrated.

The lower run of the sprocket chain 37 is loosely connected with the two side portions 30 of the weight body as indicated at 38 so that upon turning the wheel 33 so as to shift the chain 37, it will be seen that the weight 29 will be shifted lengthwise of the supporting frame on the side rails 25 thereof.

The pivotal support for the frame 26 is relatively close to one end of the frame and the weight body 29 is disposed between the frame pivots or fulcrum and the remote or outer end of the frame. At the opposite end of the frame 26 there is supported the balance weight 39 which counterbalances the weight of the frame 26, sprocket 36, chain 37, links 41 and the hereinafter referred to cross head, so that all of these parts are in equilibrium in all positions and do not affect the control weight pressure producing action.

Adjacent to the fulcrum 24 and in front of the same, upon each side of the frame 26, there is pivotally attached at the point 40 one end of an upwardly extending suspension link 41 which passes through suitable slots or openings 42 formed in the bed block 13.

The numeral 43 generally designates a pressure cylinder which has a lower portion 44 which is seated in an opening 45 in the central part of the bed block and maintained in position by the base flange 46 which rests upon and is secured to the top of the bed block as shown.

In the top of the pressure cylinder 43 are formed the tapped openings 47 into which are threadably secured the upright tie rods 48.

Above the pressure cylinder is disposed the valve body 49 and the lower portion of this body is provided with the flange 50 having openings through which the upper ends of the tie rods 48 extend. The upper ends of these tie rods are screw-threaded as shown and they carry, above and below the flange 50, the securing and adjusting nuts 51 by means of which the elevation of the valve body 49 may be changed as required with respect to the pressure cylinder 43 upon which it is supported through the medium of the tie rods 48.

The numeral 52 generally designates a cross head, each end of which is formed to provide a guide 53 through which a tie rod 48 is extended.

At each end of the cross head 52 the upper end of a link 41 is pivotally connected by the pin 54. Thus vertical movement may be imparted to the cross head through the links 41, from the oscillatable weight frame 26.

The cross head slides freely upon the tie rods 48 and the downward movement of the cross head is limited by the stop sleeves 55 which encircle the tie rods and rest upon the top of the pressure cylinder while the upward movement of the cross head is controlled by the top stop ring 56, surrounding each tie rod above the cross head and limited in its upward movement by an overlying adjustment nut 57, which is threaded to the tie rod as shown.

Secured to the top and bottom sides of the cross head 52 at the center thereof, are the top and bottom holders 58 and 59, which have threaded openings 60 and 61 respectively.

In the top and bottom holders 58 and 59 are threadably engaged the upper and lower adjustable contact points or pins 62 and 63 respectively, the function of which will be hereinafter more specifically described.

The valve body 49 has a liquid pressure chamber 64 formed therein which leads downwardly into a chamber 65 of smaller diameter, hereinafter referred to as the atmospheric chamber. The upper part of the wall of the atmospheric chamber 65 is recessed to receive a valve seat bushing 66, the upper edge of which bushing projects above the floor of the pressure chamber 64 to form the valve seat 67. Thus the two chambers 64 and 65 are connected through the valve seat bushing.

Leading laterally from the atmospheric chamber 65 is the port 68 with which is connected the liquid return or waste conduit or pipe line 69.

Leading in through the valve body, to the valve pressure chamber, is the inlet port 70 with which is connected the three-way coupling 71, having leading thereinto the high pressure inlet from a pump feed line 72 and having leading outwardly therefrom the downwardly directed pipe line 73 which carries the fluid under high pressure into the pressure cylinder 43 as hereinafter described.

Within the valve pressure chamber 64 is located the valve disc 74 which rests upon the seat 67. This valve or valve disc has an upper stem 75 and a lower stem 76.

Below the atmospheric chamber 65 in the bottom part of the valve body, is formed in axial alinement with the chamber 65, the stuffing box 77, the upper part of which is in communication by means of the reduced passage 78, with the bottom part of the chamber 65. The valve lower stem 76 passes downwardly through the passage 78 and through the stuffing box, beyond the lower or bottom side of the valve body and is alined with the top adjustable contact point 62, to be engaged thereby in the operation of the controller.

Secured within the stuffing box 77 is the gland 79 which maintains in position around the stem 76, in a suitable offset recess between the end of the gland and the passage 78, the packing 80.

The gland 79, through the center of which the valve lower stem 76 passes, is provided with the downwardly opening socket 81 in which is housed a spring 82. Threaded upon the lower end of the stem 76 is the spring adjusting nut 83 which bears against the lower end of the spring and by means of which the tension of the spring is varied as desired. Thus it will be apparent that the spring normally urges the valve 74 to move in a direction for tight contact with its seat 67.

In the top of the valve body 49 there is formed in axial alinement with the valve pressure chamber 64, the passage 84 which opens into the top of the valve pressure chamber. This passage is of enlarged diameter through the major portion of its length and starting from the top end, as shown and there is disposed within the passage 84, the lower part of the valve stem guide 85, which is maintained firmly in position by the cap 86. The upper part of this valve stem guide projects above the valve body and is provided with a transverse aperture 87 and with the flattened opposite side faces 88 to facilitate its removal when necessary. By inserting a suitable rod in the transverse passage 87 the guide may be properly held while the cap 86 is screwed out of the passage 84 or a wrench may be applied to the top end of the guide, in engagement with the flat faces 88, for the same purpose.

As shown, the valve stem guide, which closes the valve pressure chamber, has formed therein, from its lower end, the axial bore 89 into which the upper end of the valve upper stem 75, is extended. This bore acts as a guide for the upper stem 75 of the valve and, in conjunction with the action of the lower stem 76 in the passage 78, keeps the valve 74 properly centered as it moves up and down with respect to the seat 67.

As shown, the upper stem 75 of the valve, is provided with the axial fluid passage 90 which opens at its upper end into the upper part of the bore 89 while at its lower end it communicates with the lateral port 91 which opens into the valve pressure chamber. The passages 90 and 91 provide for the free movement of liquid from the valve pressure chamber into the upper end of the bore 89 in which the upper stem 75 is slidably located and the bore 89 may be made slightly larger than the upper stem 75 so that there may be a free circulation of liquid around and above the stem and valve.

In the pressure cylinder there is formed in axial alinement with the bottom contact point 63 and with the overlying valve stem 76, the fluid pressure chamber 92 in which is located the ram 93. The upper end of this fluid pressure chamber is suitably enlarged to receive a packing 94 which encircles the ram and the gland 95 through which the ram projects and which presses the packing 94 into position so as to tightly engage the ram to prevent the escape of liquid therearound.

The lower end of the pressure chamber 93 communicates with the reduced downward extension which forms a fluid receiver 96 and into this extension or fluid receiver leads the port 97 with which the lower end of the pressure cylinder supply pipe 73 is connected.

Figure 3 illustrates diagrammatically a system in which the present hydraulic pressure and flow controller mechanism is adapted to operate. In this diagram the controller is designated C while the reference P designates a fluid pump of any suitable type and the reference character M designates a press or machine tool. The reference character R designates a reservoir from which the liquid is drawn and to which excess liquid is carried from the controller and from the press or tool M.

As shown the high pressure fluid line designated 98 is coupled through the coupling 99 with the high pressure inlet 72 which leads to the controller, and the line 100 which leads to the press or machine tool M through the valve V. The return or waste pipe line 69 leads to the reservoir and from the press or machine tool M is the pipe line 101 by which excess fluid is returned to the reservoir as shown. The numeral 102 designates the supply line leading from the reservoir to the intake of the pump.

When the controller is not in operation the control weight 29 is moved on the arms 25, to the left of the neutral axis and close to the balance weight 39, thus causing the arms 25, links 41, cross head 52 and balance weight to shift. In this position the outer ends of the arms 25 remote from the balance weight 39 will be elevated. With the elevation of the outer ends of the arms the links 41 are raised together with the cross head, whereby the upper adjustable contact point 62 will be brought into engagement with the lower end of the valve bottom stem 76. The valve stem will be raised and the valve will be lifted from its seat until the cross head reaches the top stops 56 which are carried upon the tie rods. With this position of the valve, free flow of liquid will be permitted through the valve pressure chamber and the atmospheric chamber to the waste line 69.

The ram 93 in the pressure chamber 92 is free to move up or down as the liquid enters or leaves the pressure chamber. The valve 74 in the valve pressure chamber 64, when in operation and under pressure cannot be opened or closed by the movement of the cross head 52 when the control weight is in its active pressure producing position to the right of the neutral axis, except by the ram 93, at which time it is moved by the liquid in the chamber of the pressure cylinder 43. The control weight 29, with links, cross head and contact points can only open the valve 74, when the control weight is to the left of the neutral axis of the fulcrum center 24.

To start the controller in operation, the control weight 29 is moved forwardly by means of the crank handle 21 and as soon as the center of the control weight is moved past the center of the fulcrum for the weight arms, the control weight arms drop and, through their connection with the links 41, lower the cross head onto the bottom stops 55. As the cross head is lowered it breaks contact with the valve lower stem 76 and the valve is closed by the force of the spring 82.

In controllers of large size, the valve may be made of large size and heavy, so that the weight of the valve will be sufficient to overcome the frictional resistance of the packing in the stuffing box and, therefore, the valve will close under its own weight and without the employment of a spring. In small controller sizes, however, the valve is too light in weight to close without assistance and the spring 82 is, therefore, employed.

In putting the hydraulic system in operation, the controller valve as well as all other operating valves and shut-off valves in the system must be closed so that there will be no liquid escaping from the feed line. When this is done the hydraulic system becomes totally closed and is ready for operation. Upon starting the pump P, when the hydraulic system is closed and the feed line filled, there will be produced for a fraction of a second in the liquid throughout the hydraulic system, a resisting force against which the pump works. While the valve 74 in the pressure chamber 64 of the valve body 49 is closed, the liquid in the pressure chambers 92 and 96 of the pressure cylinder 43, begins to move the ram 93 upward until the ram makes contact with the bottom contact point 63 carried by the cross head 52 and as the ram 93 continues to move upward with the cross head 52, the top contact point 62 makes contact with the lower stem 76 of the valve 74, raising the valve 74 from its seat 67 and allowing the surplus liquid to flow under pressure from the pressure chamber 64 through the bushing 66 and into the atmospheric chamber 65 and then out into the outlet pipes 69 leading to the waste receiver or reservoir R.

After thus starting the hydraulic system in operation and having established pressure in the feed line 100, the press, tester or machine tool M can now be started operating by the use of the operating valve V, at any pressure required for the work to be done.

The different pressures are produced by the control weight 29 as it is moved outward by the chain 37 through the operation of the sprocket 33, shaft 16 and crank 20. In other words, by turning the crank 20 the control weight 29 is moved in one direction to increase the pressure and in the opposite direction to diminish the pressure or to zero position. Thus the pressure built up in the system will be governed by the adjustment of the control weight 29 and as the pressure continues to increase the valve 74 will be raised from its seat and the surplus liquid will be permitted to flow out through the waste line 69. In this manner the pressure for which the controller has been set, will be maintained in the system and upon the press or machine tool M.

To explain more specifically the operation which occurs, the liquid in the pressure chamber of the valve body, acting on the valve 74 and the top stem, tends to hold the valve to its seat and, therefore, the valve becomes locked in its closed position, while the liquid in the pressure chamber of the pressure cylinder, acting on the ram, can move the ram upward because the ram is not locked in a positive manner.

The simultaneous liquid pressure on the valve 74, and ram 93, produces a balanced liquid action between them with the surplus unbalanced liquid trying to escape at the same time. This condition produces two equal liquid forces in perfect balance between the valve and ram acting against each other and a third unbalanced surplus liquid active force acting at right angles to the balanced forces.

This unbalanced force of the liquid, forces its way out between the valve 74 and seat 67, against the resistance of the valve 74, and ram 93, which valve and ram are constantly tending to move towards one another by the forces acting on them. This liquid action is produced by the same liquid and pressure of that liquid with no mechanical or other control from any other source.

The unbalanced force of the surplus liquid becomes balanced by the resistance offered to its escape from between the valve 74, and its seat 67, out into the discharge line, by the balanced forces acting on the valve 74, and ram 93, thus, producing a perfect balanced active hydraulic system with no inertia involved to produce shock in the hydraulic system. To keep the active liquid forces acting on the valve 74, and ram 93, balanced, the areas of the valve and ram must be equal and the pressure resulting therefrom is equal to the resistance of the mechanism.

To provide different pressures for the hydraulic system, it has been found from experiments, that by reducing the resistance that the valve offers to the ram and providing a resistance equal to the amount reduced from the valve, and arrange it so that it will act in conjunction with the resistance of the valve on the ram, the equilibrium of the acting forces are not altered.

Since the unit pressure is the same throughout the liquid mass in the hydraulic system, the area of the valve seat in square inches must equal the area of the rim in square inches. The liquid, with reference to pressure and flow, is in equilibrium and this is the fundamental operating principle of the present invention.

Making the area of the valve 74 and the ram 93 equal will produce equal pressure on the valve 74 and ram 93, but of no specific magnitude. It will be equal to the resistance of the valve, ram and the cross head which they must overcome in their operating movement. The total acting pressure on the valve 74 or ram 93 is equal to the area multiplied by the unit pressure and any reduction in the area reduces the total pressure.

In order that the controller should produce definite pressures and at the same time maintain equilibrium of the mechanism, the valve area is reduced by a small amount and this small amount in area, multiplied by the unit pressure, gives the amount of the pressure that is reduced from the total acting pressure on the valve. This amount of reduced pressure on the valve 74 is provided by the use of the control weight 29 acting on the ram 93 to bring equilibrium to the pressure producing and controlling mechanism. It will be noted that the acting forces of the control weight 29 and the valve 74 are in opposition to the acting force of the ram 93 and since the acting force of the control weight 29 plus the acting force of the valve 74 are equal to the acting force of the ram 93, equilibrium is the result.

In the structure as disclosed in my prior patent the valve stem 75 is not provided with the port 91 and passage 90 but there is a spring disposed above the stem which maintains the valve in downward position against its seat. The upper stem of the valve is protected or shielded from the effect of the liquid pressure by a packing, thus keeping the liquid out and preventing the liquid from acting on the valve stem and since the diameter of the ram this leaves the valve free to move without any acting liquid pressure on it. The only resisting force is the small spring 49 located on the top of the valve stem 47 for closing the valve when the cross head drops to its low position. This spring is used because the valve weight with its stems is not sufficient to overcome the frictional resistance produced by the packing on the stems. All present hydraulic accumulators, relief valves, reducing valves, controller valves, shock absorbers, etc., are figured on the same basis that the controller covered by my prior patent is figured, that is, the area of the ram only is used to figure the weight to produce the pressure required. In this prior patent structure when the pump starts to operate and the valve is closed the ram begins to rise making contact with the underside of the cross head and raising the latter a predetermined distance after which the upper part of the cross head makes contact with the valve stem, raising the valve from its seat. While the cross head is raising a predetermined distance it carries with it the control weight which acts as a resistance to the upward movement of the ram and this resistance is overcome by the liquid and pressure is produced within the liquid in the hydraulic system. As the valve opens the surplus liquid starts to escape from the valve chamber and when the valve rises slowly the pressure will not drop while the liquid is escaping but when the liquid volume surges quickly and the valve also opens quickly, the liquid is drained too rapidly and therefore the liquid is bled off and the pressure drops. When this condition occurs the operation of the apparatus must be stopped and the apparatus must be started over again. In the prior patent structure the reason for this action under a sudden surge of the liquid is that the valve floats and is thrown out of balance which causes it to rise higher than the contact point of the cross head actually rises.

In the present improved controller, the liquid acts on the valve, including the upper stem as well as on the ram, at the same time in producing pressure and the pressure is maintained no matter how much or how fast the liquid is discharged from the valve chamber. In addition to the bore of passage 90 there is a slight clearance between the stem and the wall of the guide 89 so that free action of the stem is assured. With the present construction the full capacity of the pump can be discharged through the valve and the pressure will not drop but will be maintained at all times. The ram and valve are under pressure as long as the control weight is in action. The valve, while not connected to the cross head, is opened only as much as the rate of the liquid flow and pressure allows it to open. It cannot rise higher or in any manner operate other than as desired, unless it becomes broken. Unlike the prior patent structure where a control spring acts upon the valve, the liquid in the present improved structure is the medium that operates the valve and as long as there is liquid flowing the valve will operate properly and the pressure will be maintained.

I claim:

1. For use in connection with a fluid pressure generator and a machine operated thereby and connected thereto by a pressure delivery pipe line; a flow and pressure controller comprising a fluid actuated ram, means for imposing a variable resistance to the actuation of the ram under fluid pressure, a valve unit including a housing having a valve pressure chamber and an atmospheric chamber, a fluid transfer port between said chambers, a valve seat within the pressure chamber and encircling said port, a fluid inlet to the pressure chamber, a fluid outlet for the atmospheric chamber, a guide leading from the atmospheric chamber and coaxial with said ram, a valve within the pressure chamber adapted to position on said seat to close said port, a stem connected with the valve and extending therefrom through said guide in alinement with said ram, said ram being adapted to apply longitudinal thrust to said stem tending to unseat the valve after movement of the ram a predetermined distance outwardly against the said variable resistance, means for introducing fluid simultaneously and under the same pressure into the valve pressure chamber and beneath the said ram, and means by which the full pressure effect of the fluid entering the pressure chamber will be imposed upon the valve to urge the valve toward its seat with a force approximately equal to and in opposition to the thrust of the ram.

2. A flow and pressure controller of the character stated in claim 1, with a valve stem guide opening into the pressure chamber upon the side of the valve opposite from said valve stem, the outer end of the valve stem guide being closed, a stem integral with the valve and extending from the opposite side thereof from the first stem and coaxial with the first stem, the second mentioned valve stem being slidably disposed in the second mentioned guide, and means for introducing fluid from the valve pressure chambers into the second mentioned valve stem guide behind the second mentioned valve stem.

3. For use in connection with a fluid pressure generator and a machine operated thereby and connected thereto by a pressure delivery pipe line; a flow and pressure controller comprising a fluid actuated ram, means for imposing a variable resistance to the actuation of the ram under fluid pressure, a valve unit including a housing having therein a valve pressure chamber and an atmospheric chamber, a fluid transfer port between said chambers, means within the pressure chamber providing a valve seat concentric with said port, a fluid inlet port for the pressure chamber, a fluid outlet port for the atmospheric chamber, a valve stem guide leading from the atmospheric chamber toward and coaxial with the outer end of said ram, a second valve stem guide in the housing coaxial with the first guide and opening at its inner end into the pressure chamber, the outer end of the second guide being closed, a valve element within the pressure chamber and adapted to position upon said seat, a stem carried by the valve element and passing through the transfer port and through the first guide toward the outer end of the ram, a second stem carried by the valve element upon the side opposite from the first stem and extending into the second mentioned guide, means by which the ram when actuated a prescribed distance against said resistance functions to apply thrust to the first stem tending to unseat the valve element, means for conducting fluid simultaneously and at the same pressure into the pressure chamber and against the inner end of the ram, and means by which said valve element is constantly forced toward the valve seat with a force closely approximating the force applied to the ram by the pressure of the fluid in the pressure chamber applied against the outer end of the second mentioned stem in the second guide.

4. A flow and pressure controller of the character stated in claim 3, wherein the second mentioned valve stem has a fluid conducting passage opening at one end into the valve pressure chamber on the pressure side of the valve and opening at its other end into the second mentioned valve stem guide for facilitating the application of fluid pressure to the outer end of the second stem.

5. A flow and pressure controller of the character stated in claim 3, with spring means encircling the outer end of the first mentioned valve stem and connected at one end with the valve stem and connected at its other end with the housing and functioning to maintain the valve seated when the fluid pressure is withdrawn from the valve pressure chamber and the second mentioned valve stem guide.

6. For use in connection with a fluid pressure generator and a machine operated thereby and connected thereto by a pressure delivery pipe line; a flow and pressure controller comprising a fluid actuated ram, means for imposing a variable resistance to the actuation of the ram under fluid pressure, a valve unit including a housing having a fluid inlet and a fluid outlet, a valve element interposed between and normally closing fluid flow from the inlet to the outlet, means by which the ram when actuated a prescribed distance against said resistance functions to apply thrust to the valve element tending to unseat the latter, means for conducting fluid from the pressure delivery pipe line simultaneously and at the same pressure through said inlet and against the ram, means by which the full fluid pressure delivery through said inlet is applied to the valve element at a pressure closely approaching the fluid actuated thrust of the ram to oppose movement of the valve element from its seat by the thrust applied by the ram, said last means comprising a stem integral with the valve element, a guide opening into the housing upon the fluid inlet side of the valve element in which said stem has a snug sliding fit, and means for conducting the fluid into the guide behind the stem.

BENJAMIN BROWNSTEIN.

REFERENCES CITED

The following references are of record in the file of this patent:

UNITED STATES PATENTS

| Number | Name | Date |
|---|---|---|
| 1,028,986 | Bettendorf | June 11, 1912 |
| 1,254,460 | Zobell | Jan. 22, 1918 |
| 1,294,151 | Page | Feb. 11, 1919 |
| 1,608,424 | Putnam | Nov. 23, 1926 |
| 2,172,901 | Brownstein | Sept. 12, 1939 |

FOREIGN PATENTS

| Number | Country | Date |
|---|---|---|
| 17,089 | Great Britain | of 1908 |